United States Patent [19]

Matsuyama et al.

[11] Patent Number: 5,004,780

[45] Date of Patent: Apr. 2, 1991

[54] CYCLIC MONOPEROXYKETAL

[75] Inventors: Kazuo Matsuyama, Gamagori; Takashi Sugiura, Nagoya; Takeshi Komai, Chita, all of Japan

[73] Assignee: Nippon Oil and Fats Co., Ltd., Tokyo, Japan

[21] Appl. No.: 320,591

[22] Filed: Mar. 8, 1989

[30] Foreign Application Priority Data

Mar. 10, 1988 [JP] Japan .................................. 63-54752
Mar. 10, 1988 [JP] Japan .................................. 63-54753

[51] Int. Cl.$^5$ ........................ C08L 67/06; C08F 4/34; C07C 409/18
[52] U.S. Cl. ..................................... 525/27; 526/209; 526/232; 526/232.5; 568/567; 568/568
[58] Field of Search ................ 568/567, 568; 526/209, 526/232, 232.5; 525/27

[56] References Cited

U.S. PATENT DOCUMENTS

| | | | |
|---|---|---|---|
| 3,468,962 | 9/1969 | Ballini et al. | 568/563 |
| 3,576,826 | 4/1971 | Bafford et al. | 549/475 |
| 3,822,317 | 7/1974 | D'Angelo et al. | 568/567 |

FOREIGN PATENT DOCUMENTS 431086  1/1943  Japan .
56-29681  7/1981  Japan .

*Primary Examiner*—Patricia Short
*Attorney, Agent, or Firm*—Parkhurst, Wendel & Rossi

[57] ABSTRACT

A novel cyclic monoperoxyketal represented by the following general formula

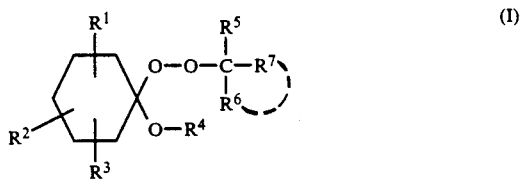

wherein $R^1$, $R^2$ and $R^3$ represent hydrogen atoms, or same or different alkyl groups having 1–3 carbon atoms, $R^4$ represents an alkyl group having 1–5 carbon atoms, $R^5$ represents an alkyl group having 1–3 carbon atoms, and $R^6$ and $R^7$ may be separate groups, in which $R^6$ represents an alkyl group having 1–3 carbon atoms and $R^7$ represents an alkyl group having 2–10 carbon atoms, a cycloalkyl group or an aryl group, or may be combined into a cylcoalkylene group having 3–12 carbon atoms, has high stability and excellent decomposition property, and is useful as a polymerization initiator of unsaturated monomers and as a curing agent of unsaturated polyester resin.

19 Claims, No Drawings

CYCLIC MONOPEROXYKETAL

BACKGROUND OF THE INVENTION (1) Field of the Invention

This invention relates to a cyclic monoperoxyketal useful as a radical reaction initiator, and more particularly relates to a cyclic monoperoxyketal useful as a polymerization initiator of unsaturated monomers and as a curing agent of unsaturated polyester resin.

(2) Related Art Statement

There are known various type organic peroxides, such as diacyl peroxide, peroxy ester, bisperoxyketal, dialkyl peroxide and the like. These organic peroxides are widely utilized as a polymerization initiator of unsaturated monomers or a curing agent of unsaturated polyester resin at 30°–150° C., or as a crosslinking agent of polyolefin at 150°–200° C. Polymerization initiator or curing agent initiates a radical addition reaction of unsaturated monomers and gives an ordinary polymer or a polymer having a network structure respectively through a chain reaction following to the radical addition reaction. Therefore, the polymerization initiator or curing agent is considered to be one kind of radical reaction initiators. On the contrary, the crosslinking agent generally causes a hydrogen-abstraction reaction from olefin to form a crosslinked polymer. Therefore, the crosslinking agent is different in the reaction mechanism from the polymerization initiator and curing agent, and is generally a very short in the length of radical chain. Recently, the development of highly value-added product having a particular property has been prevailed due to the demand of polymers having high performance and high function. Therefore, radical polymerization initiators having various properties and a high function have been demanded. Such highly value-added product having a particular property is generally produced by the use of various inorganic compounds, various polymer additives and modifiers consisting of organic compounds having a complicated structure. Accordingly, the development of a radical reaction initiator, which is stable in the presence of these additives and modifiers and can exhibit a high activity during the reaction, has been eagerly demanded. Further, even in the field of coating industry, such as paint, adhesive or the like, copolymerization of monomers having various reactive functional groups is carried out, and therefore the development of a polymerization initiator which does not react with these functional groups is demanded. That is, a radical reaction initiator is increasingly used in a composite system.

Among organic peroxides, diacyl peroxide and peroxy ester, both having a carbonyl group, are highly reactive with an acidic or basic inorganic compound, or an organic compound having a functional group, such as hydroxyl group, amino group, sulfide group or the like, and hence the diacyl peroxide and peroxy ester are not preferable in the use in the composite system. Accordingly, bisperoxyketal and dialkyl peroxide, both of which have not a carbonyl group, are preferably used in the composite system. For example, Japanese Patent Application Publication No. 56-29,861 discloses that bis-(t-alkylperoxy)ketal having a neopentyl group is excellent as a radical reaction initiator, and Japanese Patent Application Publication No. 43-1,086 discloses that monoperoxyketal is useful in the crosslinking of a copolymer of ethylene with α-olefin. Further, U.S. Pat. No. 3,822,317 discloses that 1-methoxy-1-(1,1-dimethylethylperoxy)cyclohexane can be used in the polymerization of styrene.

Bisperoxyketal and dialkyl peroxide are chemically stable, but have a drawback in their high decomposition temperature. Particularly, dialkyl peroxide is generally used at a high temperature of not lower than 120° C., and hence the development of organic peroxide, which has substantially the same decomposition activity as that of peroxy ester at substantially the same low temperature, is demanded. In general, the bisperoxyketal and dialkyl peroxide are apt to cause a hydrogen-abstraction reaction, and are useful as a crosslinking agent. The radical reaction initiator, which is used as a polymerization initiator or curing agent, is generally used for initiating a radical addition reaction, and it is not preferable to cause a large amount of the above described hydrogen-abstraction reaction. For example, in the field of coating industry, there is demanded the development of a polymerization initiator, which is stable in the composite system, and further is small in the side reactions, such as branching, crosslinking and the like, and can introduce effectively a functional group into a polymer. The bisperoxyketal is one kind of bifunctional peroxides, and has a property to widen the molecular weight distribution of the resulting polymer. Further, two t-alkyl peroxy groups bonded to one carbon atom in the bisperoxyketal decrease noticeably the compatibility with unsaturated polyester resin, with the increase of carbon numbers of the bisperoxyketal itself, and results in an incomplete curing very often. Moreover, 1,1-dimethylethylperoxyketal, although it is one of monoperoxyketals, has a very high hydrogen-abstraction property as compared with other monoperoxyketals. Therefore, the use of 1,1-dimethylethylperoxyketal is not preferable as a radical reaction initiator. Therefore, the cyclic monoperoxyketal of the present invention is an improvement of bisperoxyketal and dialkyl peroxide.

SUMMARY OF THE INVENTION

The inventors have made various investigations for developing a radical reaction initiator free from the above described drawbacks, and have found out that a cyclic monoperoxyketal having a specifically limited structure represented by the following general formula has high stability and excellent decomposition property. As a result, the present invention has been accomplished.

That is, the first aspect of the present invention lies in a cyclic monoperoxyketal represented by the following general formula

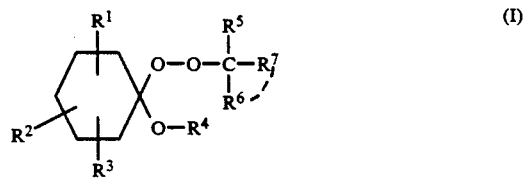

(I)

wherein R¹, R² and R³ represent hydrogen atoms, or same or different alkyl groups having 1-3 carbon atoms, R⁴ represents an alkyl group having 1-5 carbon atoms, R⁵ represents an alkyl group having 1-3 carbon atoms, and R⁶ and R⁷ may be separate groups, in which
R⁶ represents an alkyl group having 1-3 carbon atoms and
R⁷ represents an alkyl group having 2-10 carbon atoms, a cycloalkyl group or an aryl group, or may be combined into a cycloalkylene group having 3-12 carbon atoms.

The second aspect of the present invention lies in a process for polymerizing unsaturated monomer, which comprises initiating the polymerization with a cyclic monoperoxyketal represented by the following general formula (I) in an amount of 0.005-10% by weight based on the amount of the unsaturated monomer

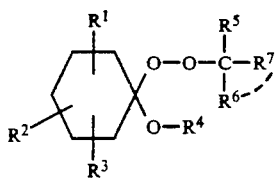
(I)

wherein R¹, R² and R³ represent hydrogen atoms, or same or different alkyl groups having 1-3 carbon atoms, R⁴ represents an alkyl group having 1-5 carbon atoms, R⁵ represents an alkyl group having 1-3 carbon atoms, and R⁶ and R⁷ may be separate groups, in which
R⁶ represents an alkyl group having 1-3 carbon atoms and R⁷ represents an alkyl group having 2-10 carbon atoms, a cycloalkyl group or an aryl group, or may be combined into a cycloalkylene group having 3-12 carbon atoms.

The third aspect of the present invention lies in a curable composition comprising an unsaturated polyester and 0.05-5.0% by weight, based on the amount of the polyester, of a curing agent consisting of a cyclic monoperoxyketal represented by the following general formula

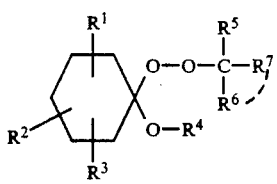
(I)

wherein R¹, R² and R³ represent hydrogen atoms, or same or different alkyl groups having 1-3 carbon atoms, R⁴ represents an alkyl group having 1-5 carbon atoms, R⁵ represents an alkyl group having 1-3 carbon atoms, and R⁶ and R⁷ may be separate groups, in which
R⁶ represents an alkyl group having 1-3 carbon atoms and R⁷ represents an alkyl group having 1-10 carbon atoms, a cycloalkyl group or an aryl group, or may be combined into a cycloalkylene group having 3-12 carbon atoms.

The term "radical reaction initiator" used in the present invention means a polymerization initiator of unsaturated monomer or a curing agent of unsaturated polyester resin composition, which predominantly carries out radical addition reactions, i.e., polymerization reaction and curing reaction, and is different from a cross-linking agent of polyolefin, which predominantly carries out a hydrogen-abstraction reaction, i.e., cross-linking reaction.

DESCRIPTION OF THE PREFERRED EMBODIMENT

The cyclic monoperoxyketal of the present invention can be produced according to commonly known methods for producing ordinary peroxyketal, for example, methods disclosed in U.S. Pat. No. 3,576,826 or 3,468,962. That is, the cyclic monoperoxyketal can be obtained by a reaction, in the presence of an acid catalyst, of a dialkylketal represented by the following general formula

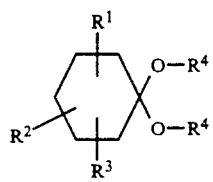
(II)

wherein R¹, R², R³ and R⁴ have the same meanings as described above, or a vinyl ether represented by the following general formula

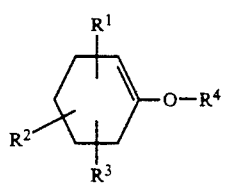
(III)

wherein R¹, R², R³ and R⁴ have the same meanings as described above, with a tertiary alkyl hydroperoxide represented by the following general formula

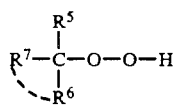
(IV)

wherein R⁵, R⁶ and R⁷ have the same meanings as described above, or by a reaction of a bisperoxyketal represented by the following general formula

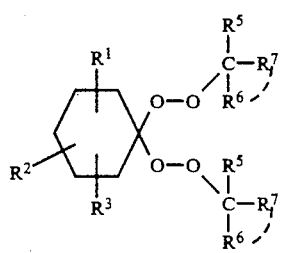
(V)

wherein R¹, R², R³, R⁵, R⁶ and R⁷ have the same meanings as described above, with an alcohol represented by the following general formula

R⁴—O—H (VI)

wherein $R^4$ has the same meaning as described above.

The acetal of ketone, which is to be used in the present invention, can be obtained by a commonly known method, that is, by a reaction of ketone with alcohol in the presence of an acid catalyst. The acetals are, for example, dimethyl, diethyl, dipropyl, dibutyl or dipentyl acetal of cyclohexanone or 3,3,5-trimethylcyclohexanone. The vinyl ether to be used in the present invention can be obtained by a dealcoholation reaction of the above described acetal.

The tertiary alkyl hydroperoxide to be used in the present invention include 1,1-dimethylethyl hydroperoxide, 1,1-dimethylpropyl hydroperoxide, 1,1-dimethylbutyl hydroperoxide, 1,1,2-trimethylpropyl hydroperoxide, 1,1,3,3-tetramethylbutyl hydroperoxide, 1-methyl-1-phenylethyl hydroperoxide, pinane hydroperoxide, p-menthane hydroperoxide and 1-methyl-1-(p-isopropylphenyl)ethyl hydroperoxide.

The bisperoxyketal to be used in the present invention can be obtained by a commonly known method, that is, can be generally obtained by the reaction of an alkyl hydroperoxide, which is relatively stable against acid, with a ketone in the presence of an acid catalyst. The bisperoxyketals include bisperoxyketal obtained by the reaction of, for example, 1,1-dimethylethyl hydroperoxide, 1,1-dimethylpropyl hydroperoxide or 1,1-dimethylbutyl hydroperoxide with cyclohexanone or 3,3,5-trimethylcyclohexanone.

Further, as the alcohol, there can be used methanol, ethanol, propanol, butanol, pentanol and the like.

The cyclic monoperoxyketals of the present invention, which are obtained by the above described methods, include 1-methoxy-1-(1,1-dimethylethylperoxy)cyclohexane, 1-methoxy-1-(1,1-dimethylpropylperoxy)cyclohexane, 1-methoxy-1-(1,1-dimethylbutylperoxy)cyclohexane, 1-methoxy-1-(1,1,2-trimethylpropylperoxy) cyclohexane, 1-methoxy-1-(1,1,3,3-tetramethylbutylperoxy)cyclohexane, 1-methoxy-1-(l-methyl-1-phenylethylperoxy)cyclohexane, 1-butoxy-1-(1,1-dimethylethylperoxy)cyclohexane, 1-butoxy-1-(1,1,3,3-tetramethylbutylperoxy)cyclohexane, 1-methoxyl-1-(1,1-dimethylbutylperoxy)-3,3,5-trimethylcyclohexane, 1-methoxy-1-p-menthaneperoxycyclohexane, 1-methoxy-1-pinaneperoxycyclohexane, 1-methoxy-(1,1,3,3-tetramethylbutylperoxy)-3,3,5-trimethylcyclohexane, 1-butoxy-1-p-menthaneperoxy-3,3,5-trimethylcyclohexane, 1-butoxy-1-pinaneperoxy-3,3,5-trimethylcyclohexane, 1-butoxy-1-(1-methyl-1-phenylethylperoxy)-3,3,5-trimethylcyclohexane and the like. The monoperoxyketals other than 1,1-dimethylethylpereoxy monoketal, which is a monoperoxyketal in the case where, $R^6$ and $R^7$ are separated groups, and $R^5$, $R^6$ and $R^7$ are methyl groups in general formula (I), and which is apt to cause easily a side reaction, such as hydrogen-abstraction reaction, are particularly preferable.

The chemical structure of the cyclic monoperoxyketal of the present invention was determined by the infrared absorption spectrum, nuclear magnetic resonance spectrum, active oxygen content and refractive index, and the purity thereof was determined by the gas chromatography and active oxygen content. Further, the thermal decomposition behavior thereof was examined by the decomposition rate constant and half-life period in cumene. As the result, it has been found that the half-life period at 100° C. of the cyclic monoperoxyketal of the present invention lies within the range of from 0.5 to 3.0 hours. That is, the monoperoxyketal of the present invention is shorter in the half-life period and is lower in the decomposition temperature than bis-(t-alkylperoxy)ketal, which is a conventional radical reaction initiator corresponding to the cyclic monoperoxyketal of the present invention.

The dialkylketal to be used in the production of the cyclic monoperoxyketal of the present invention can be produced by a commonly known method, that is, by the reaction of a corresponding ketone with a corresponding alcohol in the presence of an acid catalyst. Further, the vinyl ether to be used in the production of the cyclic monoperoxyketal of the present invention can be obtained as well by the dealcoholation reaction of a corresponding dialkylketal.

As the acid catalyst to be used in the production of the cyclic monoperoxyketal of the present invention, there can be used inorganic acids, such as sulfuric acid, hydrochloric acid, phosphoric acid and the like, and organic acids, such as trifluoroacetic acid, p-toluenesulfonic acid and the like. Further, inorganic solid acids, such as silica, alumina and acid clay, can be used as the acid catalyst. Moreover, a polymer, such as cation exchange resin, which has a sulfonic acid group, or a polymer having an alkali-reactive group, such as carboxyl group, can be used as the catalyst. The use amount of these acid catalysts lies within the range of from 0.01 to 10% by weight based on the amount of dialkylketal, vinyl ether or bisperoxyketal to be used in the raw material.

The cyclic monoperoxyketal of the present invention can be produced without the use of a solvent. However, it is desirable to use an inert solvent in order to carry out smoothly the reaction. For example, there can be used generally used solvents, such as aliphatic or aromatic hydrocarbon having 3–12 carbon atoms, and carboxylic acid ester, carboxylic acid amide, sulfoxide, ether and the like, which contain an organic group having 1–12 carbon atoms. The reaction can be carried out at a temperature within the range of from −30° to 70° C. When dialkylketal or bisperoxyketal is used as a raw material, it is advantageous to effect the reaction under vacuum in order to remove the resulting alcohol or hydroperoxide from the reaction system.

In a process for polymerizing unsaturated monomers, the cyclic monoperoxyketal of the present invention can be used as a polymerization initiator of unsaturated monomers. In this case, these unsaturated monomers include olefins, such as ethylene, propylene, styrene, vinyltoluene, vinylpyridine, vinylphenol, divinylbenzene and α-methylstyrene; conjugated olefins, such as 1,3-butadiene, isoprene and chloroprene; vinyl esters, such as vinyl acetate, vinyl propionate, vinyl laurate, vinyl benzoate and divinyl carbonate; allyl esters, such as allyl acetate, diallyl carbonate, allyl benzoate and diallyl phthalate; unsaturated conjugated nitriles, such as acrylonitrile and methacrylonitrile; acrylic acid and methacrylic acid and their esters and amides, for example, methyl, ethyl, n-butyl, 2-ethylhexyl, glycidyl and hydroxyethyl esters of acrylic acid and methacrylic acid; acrylamide and methacrylamide; maleic anhydroxide, maleic acid and fumaric acid and esters thereof; vinyl halides and vinylidene halides, such as vinyl chloride, vinyl bromide, vinyl fluoride, vinylidene chloride and vinylidene fluoride; perhaloolefins, such as trifluoroethylene, tetrafluoroethylene, hexafluoropropylene and chloro-trifluoroethylene; vinyl ethers and allyl ethers, such as methyl vinyl ether, n-butyl vinyl ether and allyl glycidyl ether; and acrolein and mixtures of the above described unsaturated monomers.

When the cyclic monoperoxyketal of the present invention is used as a polymerization initiator in a process for polymerizing unsaturated monomers, the peroxyketal is used in an amount of from 0.005 to 10% by weight based on the amount of unsaturated monomer. The polymerization reaction can be carried out through a batch system or continuous system by an ordinary polymerization technic, which includes bulk polymerization, solution polymerization, emulsion polymerization or suspension polymerization technic, wherein an unsaturated monomer and a polymerization system or a mixture thereof is charged into the reaction system. Moreover, in the present invention, the polymerization reaction can be carried out by the use of commonly known additives, and modifiers against polymer, for example, polymerization regulator, flame retardant, various fillers, shock-resistance improving agent, reinforcing agent, coloring agent, and agents which can give to a polymer an electric property, thermal property, optical property, magnetic property, stickiness, sliding property and the like.

When the cyclic monoperoxyketal of the present invention is used as a polymerization initiator in a process for polyermizing unsaturated monomers, the peroxyketal can be used in combination with other commonly known polymerization initiators. The commonly known polymerization initiators include organic peroxides, such as acetyl cyclohexylsulfonyl peroxide, isobutyl peroxide, di-2-ethylhexylperoxy dicarbonate, t-butyl peroxypivalate, dilauryl peroxide, dibenzoyl peroxide, t-butylperoxy 2-ethylhexanoate, t-butyl peroxybenzoate, 1,1-bis(t-butylperoxy)-3,3,5-trimethylcyclohexane, di-t-butyl peroxide and the like; and azo compounds, such as azobisdimethylvaleronitrile, azobisisobutyronitrile and the like. These polymerization initiators can be used as such or in the form of a solution formed by diluting the initiator by an ordinary solvent, or in the form of an emulsion or suspension formed by emulsifying or suspending the initiator in water.

Further, the cyclic monoproxyketal of the present invention can be used as a curing agent of unsaturated polyester resin composition.

The unsaturated polyester resin generally consists of an unsaturated polyester and an unsaturated monomer. In general, the unsaturated ester component can be obtained by esterifying at least one of ethylenically unsaturated di- or poly-carboxylic acids, such as maleic acid, fumaric acid, glutaconic acid, itaconic acid, mesaconic acid, citraconic acid, allylmalonic acid, allylsuccinic acid and the like, and their acid anhydrides with a saturated or unsaturated polyalcohol, such as ethylene glycol, 2,2'-dihydroxyethyl ether, ethylene glycol-bis(2-hydroxyethyl ether), 1,2-propane diol, 1,3-butane diol, 2,2'-dimethyl-1,3-propane diol, 2-butene-1,4-diol, glycerine, pentaerythritol, manitol or the like. Alternatively, as the unsaturated polyester component, there can be used a mixture of the above described acid and alcohol. Further, at least a part of the unsaturated di- or polycarboxylic acid can be replaced by saturated carboxylic acid, such as adipic acid, succinic acid, sebacic acid or the like, or replaced by aromatic dicarboxylic acid, such as phthalic acid, tetrahydrophthalic acid or the like, or anhydride of these aromatic dicarboxylic acids, for example, phthalic anhydride. These acids and alcohols occasionally have other substituents, preferably halogen substituent. Proper halogenated acids are, for example, tetrachlorophthalic acid, 1,4,5,6,7,7-hexachlorobicyclo-(2,2,1)-5-heptene-2,3-dicarboxylic acid and their anhyd ides.

The other component of the unsaturated polyester resin composition is unsaturated monomer which can be copolymerized with the above described unsaturated polyester. As the unsaturated monomer, there can be preferably used ethylenically unsaturated monomers, such as styrene, vinyltoluene, methyl methacrylate, diallyl phthalate, dibutyl fumarate, acrylonitrile, triallyl cyanurate, α-methylstyrene, divinylbenzene, methyl acrylate, diallyl maleate, n-butyl methacrylate, ethyl acrylate and the like. Further, this resin composition may contain polymeric additives and modifiers, and other additives, for example, calcium carbonate, silica, clay, alumina, titanium oxide, zinc oxide, asbestos, carbon black, glass fiber, carbon fiber and coloring agent.

Preferable resin composition contains an esterified product of propylene glycol with maleic anhydride or propylene glycol with phthalic anhydride as a polyester component, and styrene as an unsaturated monomer component.

When the cyclic monoperoxyketal of the present invention is used as a curing agent of unsaturated polyester resin composition, the peroxyketal is generally used in an amount of from 0.05 to 5.0% by weight based on the amount of the unsaturated polyester, and the curing reaction is carried out at a temperature within the range of from 20°-250° C. The cyclic monoperoxyketal of the present invention can be used together with other organic peroxide, azo compound, and further accelerators, such as amine, metal salt and the like.

The fact that the cyclic monoperoxyketal of the present invention is superior to the commonly known peroxyketal is probably due to the following reaction mechanism, which is deduced from the decomposition rate and the decomposition product. That is, when a cyclic peroxymonoketal is thermally decomposed in a cumene solvent, reversible bond and disassociation of the O—O bond are first caused in a solvent cage, and successively 3 kinds of radical active species consisting of alkyl radicals VIII and IX and an alkoxy radical VII, and a ketone are found as illustrated in the following equation (1).

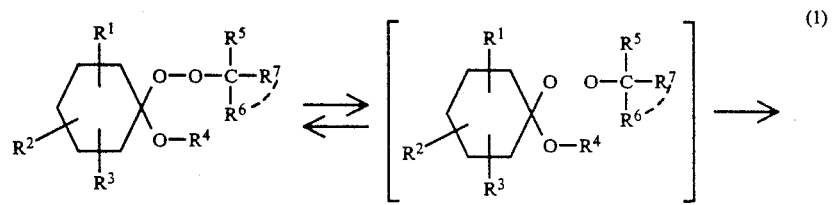

solvent cage

-continued

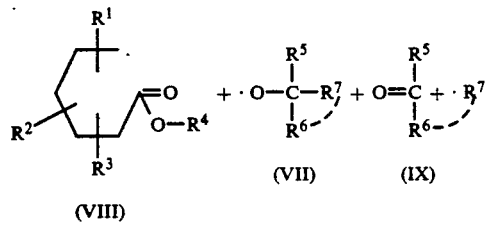

(VIII)  (VII)  (IX)

In equation (1) $R^1$, $R^2$, $R^3$, $R^4$, $R^5$, $R^6$ and $R^7$ have the same meanings as described above. However, when $R^7$ represents a phenyl group, only in the case of radical IX, $R^7$ is replaced by $R^6$, That is, $R^6$ in IX becomes a phenyl group.

The above described 3 kinds of radical active species act according to the following equations (2), (3), (4) and (5).

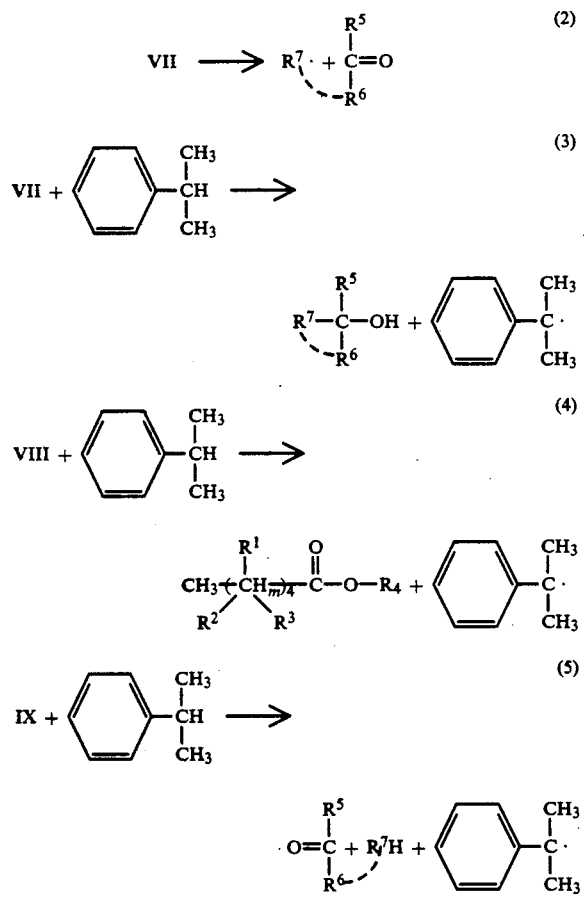

In the above equations, m is 0 or an integer of 1 or 2.

That is, radical VII is decomposed into radical IX and ketone through α-cleavage according to equation (2). Radicals VII, VIII and IX abstract a hydrogen atom from cumene according to equations (3), (4) and (5) to form corresponding alcohol, ester and alkane, respectively, and cumyl radical.

When an unsaturated monomer is present in the decomposition reaction system of the above described cyclic monoperoxyketal, the radical active species VII, VIII and IX are predominantly added to the double bond to initiate a polymerization as illustrated by equation (6). However, the alkoxy radical VII often abstracts a hydrogen atom from an unsaturated monomer, for example, from methyl methacrylate, to cause a side reaction, which affects adversely the physical properties of the resulting polymer, according to equation (7) in addition to the reaction of equation (6). Further, the radical VII often reacts with the resulting polymer according to equation (8) to form a branched polymer and a crosslinked polymer.

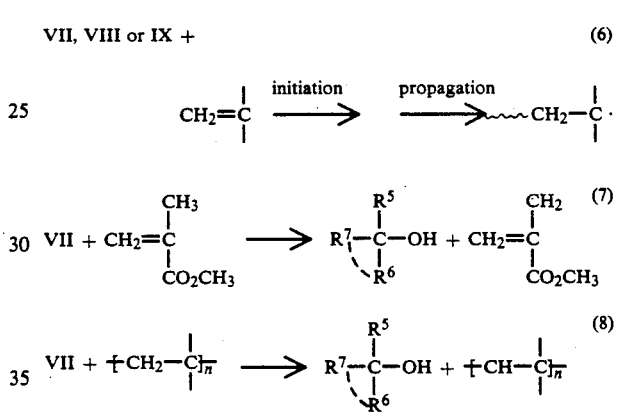

In general, it is thought that such hydrogen-abstraction reaction by the alkoxy radical has an adverse influence upon the polymerization of unsaturated monomer as described, for example, in Journal of Macromolecular Science, Chemistry, Vol. A17, page 337 (1982).

When the cyclic monoperoxyketal of the present invention is decomposed according to equation (1), a ring opening reaction concurrently occurs due to its cyclic structure. Therefore, the amount of alkoxy radical to be formed in the decomposition is small. Further, among the cyclic monoperoxyketals of the present invention, ones other than 1,1-dimethylethylperoxyketal ($R^5=R^6=R^7=CH_3$) are apt to cause easily the β-cleavage of the t-alkoxy radical according to equations (1) and (2) to form easily an alkyl radical. Therefore, the peroxyketals other than 1,1-dimethylethylperoxyketal are particularly preferable. Moreover, due to the reason that the bond and disassociation of O—O bond occur under a reversible equilibrium condition in the solvent cage, parent peroxyketal is regenerated without changing the radical pair formed in the solvent cage into an inert compound even when the viscosity of medium is increased, for example, even in the latter stage of polymerization. Therefore, the peroxyketal other than 1,1-dimethylethylperoxyketal can maintain high polymerization-initiating property.

On the contrary, when a bisperoxyketal (V) is decomposed, a radical active species (X) consisting of peroxy ester is formed as an intermediate according to equation (9), and therefore the reaction of the decomposition product is complicated.

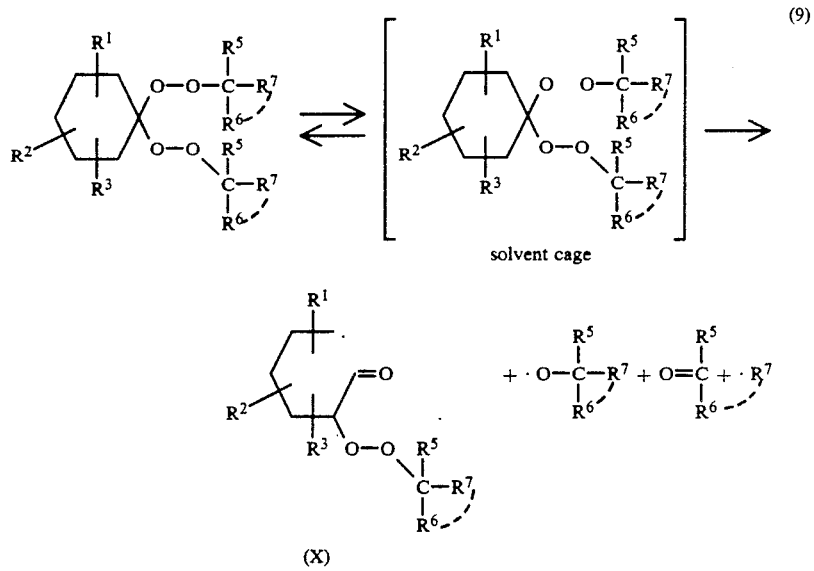

(9)

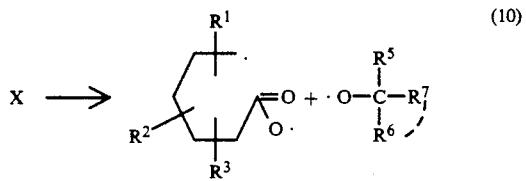

(X)

The radical active species X is a chemically unstable peroxy ester, is ionically easily decomposed, and forms very often substances which have an adverse influence upon the physical properties of the resulting polymer. Further, the radical active species X is decomposed according to equation (10) to form a biradical and to widen the molecular weight distribution.

(10)

X → [diagram showing cyclohexane with =O, O·, and O—C(R⁵)(R⁶)—R⁷ group]

The cyclic monoperoxyketal of the present invention has the following several merits due to the above described reaction mechanism.

First, the cyclic monoperoxyketal is a novel peroxyketal. This peroxyketal is chemically stable, and hence can be used in a high efficiency even in the presence of additive and modifier against polymer. Second, the peroxyketal of the present invention has a decomposition temperature lower than that of the corresponding bisperoxyketal. Therefore, the peroxyketal can be used at a low temperature. Moreover, when the peroxyketal of the present invention is used, a large amount of radical active species can be generated in a short period of time, and the polymerization reaction can be completed in a short period of time. Thirdly, the peroxyketal of the present invention can exhibit a high polymerization efficiency even in a high-viscosity medium, for example, even in the latter stage of polymerization. Fourthly, the radical active species formed from the peroxyketal of the present invention contain an alkyl radical species in a high proportion and contain, in a low proportion, radical species which cause a hydrogen-abstraction reaction and other side reactions having an adverse influence upon the polymerization. Further, the peroxyketal of the present invention does not form a peroxy ester as an intermediate contrary to bisperoxyketal, and hence the use of the peroxyketal of the present invention can produce a polymer having a low molecular weight and having a narrow distribution range of molecular weight. This fact means that the use of the peroxyketal of the present invention is preferable in the case where a functional group is introduced into a polymer by a copolymerization. Fifthly, when the peroxyketal of the present invention is used in the curing of an unsaturated polyester resin composition, the peroxyketal has a long pot-life and has a high compatibility with the resin. Therefore, the peroxyketal of the present invention is excellent as a curing agent of unsaturated polyester resin composition.

The present invention will be explained referring to the following examples and comparative examples. However, the present invention is not limited to the examples.

EXAMPLE 1

[Production of 1-methoxy-1-(1,1-dimethylethylperoxy)cyclohexane]

A mixed solution consisting of 16.4 g of dimethyl sulfoxide and 1.2 g of p-toluenesulfonic acid was kept at 20° C., and another mixed solution consisting of 28.9 g of cyclohexanone-dimethylacetal and 18.5 g of 1,1-dimethylethyl hydroperoxide was dropwise added to the former mixed solution. The resulting solution has an acid concentration of 0.1 mol/kg of the solution. The solution was stirred at 20° C. for 3 hours to complete the reaction. Then, 20 ml of petroleum ether was added to the solution, and the resulting solution was washed with 10 ml of water, then with 50 ml of a 5% NaOH aqueous solution, and further with 20 ml of water 3 times, and then dried by means of anhydrous sodium sulfate. The solvent was distilled off from the dried solution under vacuum to obtain 26.1 g (yield: 57%) of crude 1-methoxy-1-(1,1-dimethylethylperoxy)cyclohexane having a purity of 89%. The resulting crude peroxyketal was distilled at 40°–45° C. under a vacuum of 1 mmHg to obtain a purified peroxyketal having a purity of 99%.

The resulting peroxyketal was identified to be the peroxyketal of the present invention by the active oxygen content, elementary analysis value, refractive index, and IR and NMR spectra, and the structure thereof was identified by the following data:

active oxygen content: 7.88% (theoretical active oxygen content: 7.91%), elementary analysis value: C: 64.54% and H: 11.00% (theoretical value: C: 65.31% and H: 10.96%), refractive index $n_D^{20}$: 1.4423, IR spectrum 1,100 cm$^{-1}$ (—O—Me), and NMR spectrum: $\delta$3.33 (S, —O—CH$_3$, 3H), and $\delta$1.30 (S, —C(CH$_3$)$_3$, 9H).

EXAMPLE 2

[Production of 1-methoxy-1-(1,1-dimethylpropylperoxy)cyclohexane]

A mixed solution consisting of 15.9 g of dimethyl sulfoxide and 1.2 g of p-toluenesulfonic acid was kept at 20° C., into which was added dropwise another solution consisting of 29.1 g of cyclohexanone-dimethylacetal and 21.1 g of 1,1-dimethylpropyl hydroperoxide. The resulting solution had an acid concentration of 0.1 mol/kg of the solution. The solution was treated in the same manner as described in Example 1 to obtain 33.8 g (yield: 67%) of crude 1-methoxy-1-(1,1-dimethylpropylperoxy)cyclohexane having a purity of 86%. The resulting crude peroxyketal was distilled at 43°-45° C. under a vacuum of 0.1 mmHg to obtain a purified peroxyketal having a purity of 98%.

The resulting peroxyketal was identified to be the peroxyketal of the present invention by the active oxygen content, elementary analysis value, refractive index, and IR and NMR spectra, and the structure thereof was identified by the following data:

active oxygen content: 7.22% (theoretical active oxygen content: 7.40%), elementary analysis value C: 65.35% and H: 11.20% (theoretical value: C: 66.63% and H: 11.18%), refractive index $n_D^{20}$: 1.4477, IR spectrum: 1,100 cm$^{-1}$ (—O—Me), and NMR spectrum: $\delta$3.3 (S, —O—CH$_3$, 3H), $\delta$1.20 (S, —C(CH$_3$)$_2$—, 6H), and $\delta$0.90 (t, CH$_2$—CH$_3$, 3H).

EXAMPLE 3

[Production of 1-methoxy-1-(1,1-dimethylbutylperoxy)cycyclohexane]

A mixed solution consisting of 16.0 g of dimethyl sulfoxide and 1.3 g of p-toluenesulfonic acids was kept at 20° C., to which was added dropwise another mixed solution consisting of 28.8 g of cyclohexanonedimethylacetal and 23.8 g of 1,1-dimethylbutyl hydroperoxide. The resulting solution had an acid concentration of 0.1 mol/kg of the solution. The solution was treated in the same manner as described in Example 1 to obtain 39.0 g (yield: 69%) of crude 1-methoxy-1-(1,1-dimethylbutylperoxy)cyclohexane having a purity of 81%. The resulting crude peroxyketal was distilled at 47°-50° C. under a vacuum of 0.1 mmHg to obtain a purified peroxyketal having a purity of 97%.

The resulting peroxyketal was identified to be the peroxyketal of the present invention by the active oxygen content, elementary analysis value, refractive index, and IR and NMR spectra, and the structure thereof was identified by the following data:

active oxygen content: 6.74% (theoretical active oxygen content: 6.95%), elementary analysis value: C: 66.52% and H: 11.25% (theoretical value: C: 67.79% and H: 11.38%), refractive index $n_D^{20}$: 1.4486, IR spectrum: 1,100 cm$^{-1}$ (—O—Me), and NMR spectrum: $\delta$3.3 (S, —O—CH$_3$, 3H), $\delta$1.25 (S, —C(CH$_3$)$_2$—, 6H) and 6 0.95 (t, —CH$_2$—CH$_3$, 3H).

EXAMPLE 4

[Production of 1-methoxy-1-(1,1,3,3-tetramethylbutylperoxy)cyclohexane]

A mixed solution consisting of 16.1 g of dimethyl sulfoxide and 1.4 g of p-toluenesulfonic acid was kept at 20° C., to which was added dropwise another mixed solution consisting of 28.9 g of cyclohexanonedimethylacetal and 30.2 g of 1,1,3,3-tetramethylbutyl hydroperoxide. The resulting solution had an acid concentration of 0.1 mol/kg of the solution. The solution was treated in the same manner as described in Example 1 to obtain 40.0 g (yield: 69%) of crude 1-methoxy-1-(1,1,3,3-tetramethylbutylperoxy)cyclohexane having a purity of 79%. Unreacted substances were distilled off from the crude peroxyketal by a vacuum distillation at 33°-35° C. under a vacuum of 0.1 mmHg, whereby the above described peroxyketal having a purity of 90% was obtained. Further, this peroxyketal was purified by means of a silica gel column chromatography, which uses hexane as a mobile phase, to obtain the above described peroxyketal having a purity of 92%.

The resulting peroxyketal was identified to be the peroxyketal of the present invention by the active oxygen content, elementary analysis value, refractive index, and IR and NMR spectra, and the structure thereof was identified by the following data:

active oxygen content: 5.71% (theoretical active oxygen content: 6.19%), elementary analysis value: C: 68.69% and H: 11.81% (theoretical value: C: 69.70% and H: 11.70%), refractive index $n_D^{20}$: 1.4537, IR spectrum 1,100 cm$^{-1}$ (—O—Me), and NMR spectrum: $\delta$3.3 (S, —O—CH$_3$, 3H), $\delta$1.30 (S, —C(CH$_3$)$_2$—, 6H) and 1.00 (S, —C(CH$_3$)$_3$, 9H).

EXAMPLE 5

Production of 1-methoxy-1-(1-methyl-1-phenylethylperoxy)cyclohexane]

A mixed solution consisting of 16.2 g of dimethyl sulfoxide and 1.4 g of p-toluenesulfonic acid was kept at 20° C., to which was added dropwise another mixed solution consisting of 29.0 g of cyclohexanonedimethylacetal and 27.2 g of 1-methyl-1-phenylethyl hydroperoxide. The resulting solution had an acid concentration of 0.1 mol/kg of the solution. The solution was treated in the same manner as described in Example 1 to obtain 39.5 kg (yield: 55%) of crude 1-methoxy-1-(1-methyl-1-phenylethylperoxy)cyclohexane having a purity of 74%. The resulting crude peroxyketal was purified by means of a silica gel column chromatography, which uses hexane as a mobile phase, to obtain a purified peroxyketal having a purity of 97%.

The resulting peroxyketal was identified to be the peroxyketal of the present invention by the active oxygen content, elementary analysis value, refractive index, and IR and NMR spectra, and the structure thereof was identified by the following data:

active oxygen content: 5.87% (theoretical active oxygen content: 6.05%), elementary analysis value: C: 72.25% and H: 9.32% (theoretical value: C: 72.69% and H: 9.15%), refractive index $n_D^{20}$: 1.5087, IR spectrum: 1,100 cm$^{-1}$ (—O—Me), and NMR spectrum: $\delta$3.2 (S, —O—CH$_3$, 3H) and $\delta$7.3-7.6 (Ph—, 5H).

EXAMPLE 6

[Production of 1-methoxy-1-(1,1-dimethylbutylperoxy)-3,3,5-trimethylcyclohexane]

A mixed solution consisting of 20.7 g of dimethyl sulfoxide and 1.6 g of p-toluenesulfonic acid was kept at 20° C., to which was added dropwise another mixed solution consisting of 37.3 g of 3,3,5-trimethyl-cylcohexanone-dimethylacetal and 23.8 g of 1,1-dimethylbutyl hydroperoxide. The resulting solution had an acid concentration of 0.1 mol/kg of the solution. The solution was treated in the same manner as described in Example 1 to obtain 50.3 g (yield: 68%) of crude 1-methoxy-1-(1,1-dimethylbutylperoxy)-3,3,5-trimethyl-cyclohexane having a purity of 75%. The resulting crude peroxyketal was distilled at 68°–72° C. under a vacuum of 0.005 mmHg to obtain a purified peroxyketal having a purity of 96%.

The resulting peroxyketal was identified to be the peroxyketal of the present invention by the active oxygen content, elementary analysis value, refractive index, and IR and NMR spectra, and the structure thereof was identified by the following data:

active oxygen content: 5.64% (theoretical active oxygen content: 5.87%), elementary analysis value: C: 69.87% and H: 12.11% (theoretical value: C: 70.54% and H: 11.84%), refractive index $n_D^{20}$: 1.4490, IR spectrum: 1,100 cm$^{-1}$ (—O—Me), and NMR spectrum: $\delta$3.3 (S, —O—CH$_3$, 3H), $\delta$1.27 (S, —C(CH$_3$)$_2$—, 6H), and $\delta$1.2–0.90 (>C(CH$_3$)$_2$, >CH—CH$_3$, —CH$_2$—CH$_2$—CH$_3$, 16H).

EXAMPLES 7–12 AND COMPARATIVE EXAMPLES 1–6

[Thermal decomposition of peroxyketal in cumene]

A 0.05 mol/l cumene solution of each of the cyclic monoperoxyketals of the present invention produced in Examples 1–6 and the cyclic bisperoxyketals produced in the same manner as described in Examples 1–6 was prepared. A given amount of each sample solution was sampled into a glass ampule, and the sample solution was deaerated by a freezing method, and then the ampule was sealed under vacuum. Then, the ampules were put in a thermostat kept at 100° C., and taken out from the thermostate every predetermined times, and the concentration of peroxyketal was measured by a gas chromatography or liquid chromatography. The decomposition rate constant and half-life period of a sample peroxyketal were calculated from the disappearing rate of the peroxyketal. The obtained results are shown in the following Table 1 as Examples 6–12 and Comparative examples 1–6.

TABLE 1

Result of thermal decomposition of peroxyketal at 100° C.

| Example and Comparative example | Peroxyketal | Decomposition rate constant ×10$^5$ (1/sec) | Half-life period (hr) |
|---|---|---|---|
| Example 7 | 1-methoxy-1-(1,1-dimethylethylperoxy)cyclohexane | 6.79 | 2.84 |
| Example 8 | 1-methoxy-1-(1,1-dimethylpropylperoxy)cyclohexane | 10.58 | 1.82 |
| Example 9 | 1-methoxy-1-(1,1-dimethylbutylperoxy)cyclohexane | 11.20 | 1.72 |
| Example 10 | 1-methoxy-1-(1,1,3,3-tetramethylbutylperoxy)cyclohexane | 28.40 | 0.68 |
| Example 11 | 1-methoxy-1-(1-methyl-1-phenylethylperoxy)cyclohexane | 11.32 | 1.70 |
| Example 12 | 1-methoxy-1-(1,1-dimethylbutylperoxy)-3,3,5-trimethylcyclohexane | 11.25 | 1.71 |
| Comparative example 1 | 1,1-bis(1,1-dimethylethylperoxy)cyclohexane | 5.06 | 3.81 |
| Comparative example 2 | 1,1-bis(1,1-dimethylpropylperoxy)cyclohexane | 7.32 | 2.63 |
| Comparative example 3 | 1,1-bis(1,1-dimethylbutylperoxy)cyclohexane | 7.48 | 2.57 |
| Comparative example 4 | 1,1-bis(1,1,3,3-tetramethylbutylperoxy)cyclohexane | 19.83 | 0.97 |
| Comparative example 5 | 1,1-bis(1-methyl-1-phenylethylperoxy)cyclohexane | 8.24 | 2.34 |
| Comparative example 6 | 1,1-bis(1,1-dimethylbutylperoxY)-3,3,5-trimethylcyclohexane | 7.50 | 2.57 |

It can be seen from the composition of Examples 7–12 with Comparative examples 1–6 that the cyclic monoperoxyketal of the present invention decomposes in a rate considerably higher than the decomposition rate of the corresponding cyclic bisperoxyketal, and hence is a peroxide which is more active than the corresponding cyclic bisperoxyketal at a low temperature.

EXAMPLES 13–15

Thermal decomposition of 1-methoxy-1-(1,1-dimethylethylperoxy)cyclohexane at 100° C. was carried out in the same manner as described in Example 7, except that n-hexane, n-dodecane or n-hexadecane was used as a solvent in place of cumene, and the thermal decomposition rate constant and half-life period of the cyclic monoperoxyketal in these solvents were measured. The obtained results are shown in the following Table 2 as Examples 13–15.

TABLE 2

Result of thermal decomposition of 1-methoxy-1-(1,1-dimethylethylperoxy)cyclohexane at 100° C.

| Example | Solvent | Viscosity (cp) | Decomposition rate constant ×10$^5$ (1/sec) | Half-life period (hr) |
|---|---|---|---|---|
| 13 | n-hexane | 0.168 | 5.13 | 3.75 |
| 14 | n-dodecane | 0.520 | 4.71 | 4.09 |
| 15 | n-hexadecane | 0.900 | 4.23 | 4.55 |

It can be seen from Examples 13–15 that the decomposition rate is decreased with the increase of the viscosity of solvent, and therefore when the cyclic monoperoxyketal of the present invention is thermally decomposed, reversible bond and diassociation of O—O bond are caused in the solvent cage as illustrated by the reaction equation (1). That is, the parent peroxyketal is regenerated without the formation of inert substances by the increase of the viscosity of solvent. This illustrates that the peroxyketal can maintain a high polymerization-initiating efficiency even in a high-viscosity solvent.

EXAMPLE 16 AND COMPARATIVE EXAMPLE 7

[Thermal decomposition product of peroxyketal in cumene]

Each of the thermal decomposition reaction solutions of Example 7 and Comparative example 1 was analyzed by means of a gas chromatography to measure the thermal decomposition products. The number of mols of the decomposition products per 1 mol of each of the decomposed peroxyketals was calculated. The obtained results are shown in the following Table 3 as Example 16 and Comparative example 7.

TABLE 3

| Example and Comparative example | Peroxyketal | Thermal decomposition product | Number of mols per 1 mol of decomposed peroxyketal |
|---|---|---|---|
| Example 16 | 1 methoxy-1-(1,1-dimethylethyl-peroxy)cyclohexane | acetone | 0.10 |
| | | t-butanol | 0.47 |
| | | methyl hexanoate | 0.59 |
| | | biscumyl | 0.50 |
| Comparative example 7 | 1,1-bis(1,1-dimethylethyl-peroxy)cyclohexane | t-butanol | 1.06 |
| | | 1,1-dimethyl-peroxy-hexanoate | 0.35 |
| | | biscumyl | 0.69 |

The results of Example 16 and Comparative example 7 illustrate that the cyclic monoperoxyketal of the present invention and the cyclic bisperoxyketal used as a comparative example are decomposed along the equations (1)–(5) and equations (9) and (10), respectively.

EXAMPLES 17-22 AND COMPARATIVE EXAMPLES 8-13

[Amounts of ketone and alcohol formed by the thermal decomposition of peroxyketal in cumene]

The amount of ketone and that of alcohol contained in each of the thermal decomposition solutions obtained in Examples 6–12 and Comparative examples 1–6 were measured by means of a gas chromatography. The numbers of mols of ketone and alcohol per 1 mol of each of decomposed cyclic monoperoxyketal or cyclic bisperoxyketal were measured. The obtained results are shown in the following Table 4 as Examples 17–22 and Comparative examples 8–13.

TABLE 4

| Example and Comparative example | Peroxyketal | Thermal decomposition product at 100° C. | | |
|---|---|---|---|---|
| | | Ketone | Alcohol | Ratio[1] |
| Example 17 | 1-methoxy-1-(1,1-dimethylethylperoxy)cyclohexane | 0.10 | 0.47 | 0.21 |
| Example 18 | 1-methoxy-1-(1,1-dimethylpropylperoxy)cyclohexane | 0.80 | 0.14 | 5.71 |
| Example 19 | 1-methoxy-1-(1,1-dimethylbutylperoxy)cyclohexane | 0.70 | 0.31 | 2.26 |
| Example 20 | 1-methoxy-1-(1,1,3,3,-tetramethylbutylperoxy)cyclohexane | 0.79 | 0.01 | 79.0 |
| Example 21 | 1-methoxy-1-(1-methyl-1-phenylethylperoxy)cyclohexane | 0.25[2] | 0.60 | 0.42 |
| Example 22 | 1-methoxy-1-(1,1-dimethylbutylperoxy)-3,3,5-trimethylcyclohexane | 0.68 | 0.30 | 2.27 |
| Comparative example 8 | 1,1-bis(1,1-dimethylethylperoxy)cyclohexane | 0.02 | 1.37 | 0.01 |
| Comparative example 9 | 1,1-bis(1,1-dimethylpropylperoxy)cyclohexane | 0.73 | 0.26 | 2.81 |
| Comparative example 10 | 1,1-bis(1,1-dimethylbutylperoxy)cyclohexane | 0.83 | 0.65 | 1.28 |
| Comparative example 11 | 1,1-bis(1,1,3,3-tetramethylbutylperoxy)cyclohexane | 0.29 | 0.24 | 1.21 |
| Comparative example 12 | 1,1-bis(1-methyl-1-phenylethylperoxy)cyclohexane | 0.41[2] | 1.00 | 0.41 |
| Comparative example 13 | 1,1-bis(1,1-dimethylbutylperoxY)-3,3,5-trimethylcyclohexane | 0.80 | 0.64 | 1.25 |

[1]Ratio of ketone to alcohol
[2]Acetophenone is formed

The ratio of the formed amount of ketone to the formed amount of alcohol is a measure of the formed amount of alkoxy radical as understood from equations (2) and (3). It can be seen from the comparison of Examples 17–22 with Comparative examples 8–13 in Table 4 that the cyclic monoperoxyketal of the present invention is smaller than the corresponding cyclic bisperoxyketal in the amount of alkoxy radical formed therefrom, and further that a peroxyketal having a 1,1-dimethylethylperoxy group is larger than a peroxyketal having the other t-alkylperoxy group in the amount of alkoxy radical formed therefrom.

EXAMPLES 23-28 AND COMPARATIVE EXAMPLES 14-19

[Polymerization of unsaturated monomers]

A 0.01 mol/l styrene solution and a 2.0 g/l styrene solution of each of the cyclic monoperoxyketals obtained in Examples 1–6 and the cyclic bisperoxyketals obtained in the same manner as described in Examples 1–6 were produced. A given amount of each sample solution was sampled into a glass ampule, and the sample solution was deaerated by a freeze-thaw technic, and then the ampule was sealed under vacuum. Then, the ampules were put in a thermostat kept at 80° C., taken out from the thermostat every predetermined times, and cooled to −20° C. Then, the ampule was opened, and the reaction product in the ampule was poured into benzene, and the resulting polymer was precipitated from the benzene solution by the use of methanol. The precipitate was separated by filtration and then dried for 24 hours under vacuum. The polymerization rate was measured by the gravimetric method. The molecular weight of the resulting polymer was measured by the GPC. The results at the degree of polymerization conversion of 10% are shown in the following Table 5 as Examples 23–28 and Comparative example 14–19.

TABLE 5(a)

Result of polymerization of styrene

| Example and Comparative example | Peroxyketal | Amount of initiator used mol/l | Amount of initiator used g/l | Polymerization rate $\times 10^5$ (mol/l/s) | Molecular weight $\times 10^{-4}$ Mn | Molecular weight $\times 10^{-4}$ Mw |
|---|---|---|---|---|---|---|
| Example 23 | 1-methoxy-1-(1,1-dimethylethylperoxy)cyclohexane | 0.01 | — | 9.56 | 15.9 | 30.6 |
| | | — | 2.0 | 9.51 | 16.0 | 30.4 |
| Example 24 | 1-methoxy-1-(1,1-dimethylpropylperoxy)cyclohexane | 0.01 | — | 11.93 | 14.5 | 26.8 |
| | | — | 2.0 | 11.47 | 15.1 | 27.0 |
| Example 25 | 1-methoxy-1-(1,1-dimethylbutylperoxy)cyclohexane | 0.01 | — | 12.18 | 14.2 | 24.7 |
| | | — | 2.0 | 11.35 | 15.2 | 26.3 |
| Example 26 | 1-methoxy-1-(1,1,3,3,-tetramethylbutylperoxy)cyclohexane | 0.01 | — | 19.39 | 9.1 | 14.8 |
| | | — | 2.0 | 17.01 | 10.4 | 17.1 |
| Example 27 | 1-methoxy-1-(1-methyl-1-phenylethylperoxy)cyclohexane | 0.01 | — | 12.61 | 13.3 | 23.6 |
| | | — | 2.0 | 10.97 | 15.3 | 27.1 |
| Example 28 | 1-methoxy-1-(1,1-dimethylbutylperoxy)-3,3,5-trimethylcyclohexane | 0.01 | — | 11.60 | 15.6 | 26.0 |
| | | — | 2.0 | 8.67 | 20.9 | 34.8 |

TABLE 5(b)

Result of polymerization of styrene

| Example and Comparative example | Peroxyketal | Amount of initiator used mol/l | Amount of initiator used g/l | Polymerization rate $\times 10^5$ (mol/l/s) | Molecular weight $\times 10^{-4}$ Mn | Molecular weight $\times 10^{-4}$ Mw |
|---|---|---|---|---|---|---|
| Comparative example 14 | 1,1-bis(1,1-dimethylethylperoxy)cyclohexane | 0.01 | — | 9.12 | 17.9 | 32.3 |
| | | — | 2.0 | 7.99 | 20.4 | 36.8 |
| Comparative example 15 | 1,1-bis(1,1-dimethylpropylperoxy)cyclohexane | 0.01 | — | 10.97 | 1.64 | 27.9 |
| | | — | 2.0 | 9.13 | 19.7 | 33.5 |
| Comparative example 16 | 1,1-bis(1,1-dimethylbutylperoxy)cyclohexane | 0.01 | — | 11.59 | 15.5 | 26.1 |
| | | — | 2.0 | 9.21 | 19.5 | 32.8 |
| Comparative example 17 | 1,1-bis(1,1,3,3-tetramethylbutylperoxy)cyclohexane | 0.01 | — | 18.43 | 10.2 | 16.4 |
| | | — | 2.0 | 13.50 | 13.9 | 22.4 |
| Comparative example 18 | 1,1-bis(1-methyl-1-phenylethylperoxy)cyclohexane | 0.01 | — | 12.03 | 14.9 | 24.9 |
| | | — | 2.0 | 8.68 | 20.7 | 34.6 |
| Comparative example 19 | 1,1-bis-(1,1-dimethylbutylperoxY)-3,3,5-trimethylcyclohexane | 0.01 | — | 11.60 | 15.6 | 26.0 |
| | | — | 2.0 | 8.67 | 20.9 | 34.8 |

It can be seen from the comparison of the examples with comparative examples in Table 5 that, when the cyclic monoperoxyketal of the present invention and the corresponding cyclic bisperoxyketal were used as initiators in the same mol concentration or in the same weight concentration, the use of the cyclic monoperoxyketal of the present invention is higher in the polymerization rate and lower in the molecular weight of the resulting polymer than the use of the corresponding cyclic bisperoxyketal.

EXAMPLES 29 AND 30 AND COMPARATIVE EXAMPLES 20 AND 21

[Production of acrylic resin]

Into a glass reaction vessel equipped with an agitator, a thermometer and a reflux cooler was charged 30 g of isooctyl acetate as a solvent, and then a mixture of monomers and an initiator, which consisted of 30 g of butyl acrylate, 20 g of 2-hydroxyethyl acrylate, 20 g of butyl methacrylate, 30 g of styrene and 0.030 mol equivalent, calculated as the amount of active oxygen, of a peroxyketal, was charged dropwise into the vessel under agitation in 5 hours at a temperature of 125° C. under a nitrogen atmosphere. The agitation was further continued for 2 hours to complete the polymerization. As the initiator, the cyclic monoperoxyketals produced in Examples 1 and 3 and the cyclic bisperoxyketals produced in the same manner as described in Examples 1and 3 were used. The obtained results are shown in the following Table 6 as Examples 29 and 30 and Comparative examples 20 and 21, respectively. The molecular weight of the resulting acrylic resin was measured by the GPC with the use of polystyrene as a standard substance.

TABLE 6

Result of the production of acrylic resin

| Example and Comparative example | Initiator | Amount of initiator used[1] (mol) | Molecular weight Mn | Molecular weight Mw/Mn |
|---|---|---|---|---|
| Example 29 | 1-methoxy-1-(1,1-dimethylethylperoxy)cyclohexane | 0.030 | 4,100 | 2.8 |
| Example 30 | 1-methoxy-1-(1,1-dimethylbutylperoxy)cyclohexane | 0.030 | 3,600 | 2.1 |
| Comparative example 20 | 1,1-bis(1,1-dimethylethylperoxy)cyclohexane | 0.015 | 5,400 | 4.1 |
| Comparative example 21 | 1,1-bis(1,1-dimethylbutylperoxy)cyclohexane | 0.015 | 4,700 | 3.1 |

[1]Corresponds to 0.03 mol equivalent in the amount of active oxygen

It can be seen from the comparison of the examples with the comparative examples shown in Table 6 that the use of the cyclic monoperoxyketal of the present invention results in an arylic resin having a lower molecular weight and a narrower molecular weight distribution range than the use of the corresponding cyclic bisperoxyketal.

EXAMPLES 31-36 AND COMPARATIVE EXAMPLES 22-28

[Curing of unsaturated polyester resin]

An unsaturated polyester resin (Trade mark: Epolac G110 AL sold by Nippon Shokubai Kagaku Kogyo Co., Ltd.) was cured according to the "Test method for liquid unsaturated polyester resin" in JIS K6901.

The unsaturated polyester resin was mixed with a cyclic monoperoxyketal or a cyclic bisperoxyketal, and a curing test of the unsaturated polyester resin was effected in a thermostat kept at 80° C., and the gelation time (GT), curing time (CT) and peak exothermic temperature (PET) were measured. The addition amount of a catalyst is 1% by weight, calculated as the amount of active oxygen, of 1,1-dimethylethyl peroxybenzoate based on the amount of an unsaturated polyester resin.

Further, the pot-life at 40° C. of the unsaturated polyester resin containing the catalyst added thereto was measured by the visual observation.

The obtained results are shown in the following Table 7 as Examples 31-36 and Comparative examples 22-28.

TABLE 7(a)

Curing of unsaturated polyester resin

| Example and Comparative example | Peroxyketal | Addition amount (%) | Solubility | Gelation time (min) | Curing time (min) | Peak exothermic temperature (°C.) | Pot-life (hr) |
|---|---|---|---|---|---|---|---|
| Example 31 | 1-methoxy-1-(1,1-dimethylethylperoxy)cyclohexane | 1.04 | | 13.3 | 16.6 | 191 | 22 |
| Example 32 | 1-methoxy-1-(1,1-dimethylpropylperoxy)cyclohexane | 1.11 | | 9.4 | 11.7 | 200 | 20 |
| Example 33 | 1-methoxy-1-(1,1-dimethylbutylperoxy)cyclohexane | 1.19 | | 9.3 | 11.5 | 199 | 20 |
| Example 34 | 1-methoxy-1-(1,1,3,3,-tetramethylbutylperoxy)cyclohexane | 1.33 | | 5.2 | 6.3 | 204 | 17 |
| Example 35 | 1-methoxy-1-(1-methyl-1-phenylethylperoxy)cyclohexane | 1.36 | | 12.8 | 15.4 | 198 | 24 |
| Example 36 | 1-methoxy-1-(1,1-dimethylbutylperoxy)-3,3,5-trimethylcyclohexane | 1.41 | | 9.5 | 11.7 | 195 | 21 |

TABLE 7(b)

Curing of unsaturated polyester resin

| Example and Comparative example | Peroxyketal | Addition amount (%) | Solubility | Gelation time (min) | Curing time (min) | Peak exothermic temperature (°C.) | Pot-life (hr) |
|---|---|---|---|---|---|---|---|
| Comparative example 22 | 1,1-bis(1,1-dimethylethylperoxy)cyclohexane | 0.67 | | 28.5 | 32.9 | 182 | 69 |
| Comparative example 23 | 1,1-bis(1,1-dimethylpropylperoxy)cyclohexane | 0.74 | Δ | 19.8 | 22.8 | 191 | 67 |
| Comparative example 24 | 1,1-bis(1,1-dimethylbutylperoxy)cyclohexane | 0.81 | Δ | 20.6 | 24.0 | 188 | 69 |
| Comparative example 25 | 1,1-bis(1,1,3,3-tetramethylbutylperoxy)cyclohexane | 0.96 | X | 11.2 | 13.3 | 201 | 41 |
| Comparative example 26 | 1,1-bis(1-methyl-phenylethylperoxy)cyclohexane | 0.99 | | 25.3 | 28.9 | 185 | 63 |
| Comparative example 27 | 1,1-bis(1,1-dimethylbutylperoxy)-3,3,5-trimethylcyclohexane | 0.93 | Δ | 20.5 | 24.1 | 187 | 68 |
| Comparative example 28 | 1,1-dimethylethyl peroxybenzoate | 1.00 | | 30.8 | 43.0 | 139 | 15 |

:Complete dissolving,
Δ: Fairly long time was required in dissolving,
X: Incomplete dissolving (white turbid)

It can be seen from the results shown in Table 7 that a peroxyketal having no carbonyl group is longer in the pot-life in spite of shorter times required in the gelation and the curing of unsaturated polyester resin than 1,1-dimethylethyl peroxybenzoate having a carbonyl group. Moreover, the cyclic monoperoxyketal of the present invention is superior to the corresponding cyclic bisperoxyketal in the solubility in a resin and in the ability for curing the resin.

What is claimed is:

1. A cyclic monoperoxyketal represented by the following general formula

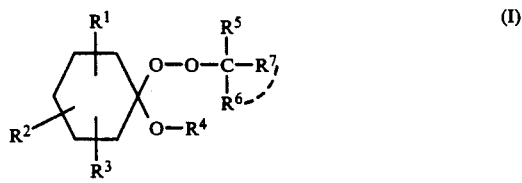

(I)

wherein $R^1$, $R^2$ and $R^3$ represent hydrogen atoms, or same or different alkyl groups having 1-3 carbon atoms, $R^4$ represents an alkyl group having 1-5 carbon atoms, $R^5$ represents an alkyl group having 1-3 carbon atoms, and $R^6$ and $R^7$ may be separate groups, in which $R^6$ represents an alkyl group having 1-3 carbon atoms and $R^7$ represents an alkyl group having 2-10 carbon atoms, a cycloalkyl group or an aryl group, or may be combined into a cycloalkylene group having 3-12 carbon atoms.

2. A cyclic monoperoxyketal according to claim 1, wherein $R^7$ represents an alkyl group having 3-10 carbon atoms.

3. A cyclic monoperoxyketal according to claim 1, consisting of 1-methoxy-1-(1,1-dimethylbutylperoxy)-cyclohexane.

4. A cyclic monoperoxyketal according to claim 1, consisting of 1-methoxy-1-(1,1,3,3-tetramethylbutylperoxy)cyclohexane.

5. A cyclic monoperoxyketal according to claim 1, consisting of 1-methoxy-1-(1-methyl-1-phenylethylperoxy)cyclohexane.

6. A cyclic monoperoxyketal according to claim 1, consisting of 1-methoxy-1-(1,1-dimethylbutylperoxy)-3,3,5-trimethylcyclohexane.

7. A process for polymerizing unsaturated monomer, which comprises initiating the polymerization with a cyclic monoperoxyketal of the formula (I) in an amount of 0.005-10% by weight based on the amount of the unsaturated monomer,

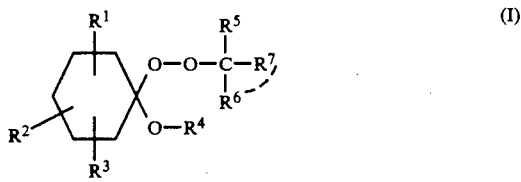

(I)

wherein $R^1$, $R^2$ and $R^3$ represent hydrogen atoms, or same or different alkyl groups having 1-3 carbon atoms, $R^4$ represents an alkyl group having 1-5 carbon atoms, $R^5$ represents an alkyl group having 1-3 carbon atoms, and $R^6$ and $R^7$ may be separate groups, in which $R^6$ represents an alkyl group having 1-3 carbon atoms and $R^7$ represents an alkyl group having 2-10 carbon atoms, a cycloalkyl group or an aryl group, or may be combined into a cycloalkylene group having 3-12 carbon atoms.

8. A process for polymerizing unsaturated monomer according to claim 7, wherein $R^6$ and $R^7$ may be separate groups, in which $R^6$ represents an alkyl group having 1-3 carbon atoms and $R^7$ represents an alkyl group having 2-10 carbon atoms.

9. A process for polymerizing unsaturated monomer according to claim 7, wherein the formula (I) is 1-methoxy-1-(1,1-dimethylpropylperoxy)cyclohexane.

10. A process for polymerizing unsaturated monomer according to claim 7, wherein the formula (I) is 1-methoxy-1-(1,1-dimethylbutylperoxy)cyclohexane.

11. A process for polymerizing unsaturated monomer according to claim 7, wherein the formula (I) is 1-methoxy-1-(1,1,3,3-tetramethylbutylperoxy)cyclohexane.

12. A process for polymerizing unsaturated monomer according to claim 7, wherein the formula (I) is 1-methoxy-1-(1-methyl-1-phenylethylperoxy)cyclohexane.

13. A process for polymerizing unsaturated monomer according to claim 7, wherein the formula (I) is 1-methoxy-1-(1,1-dimethylbutylperoxy)-3,3,5-trimethylcyclohexane.

14. A curable composition comprising an unsaturated polyester resin and 0.05-5.0% by weight, based on the amount of the unsaturated polyester resin, of a curing agent consisting of a cyclic monoperoxyketal represented by formula (I)

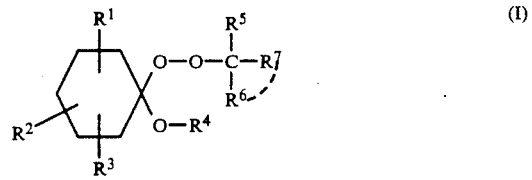

(I)

wherein $R^1$, $R^2$ and $R^3$ represent hydrogen atoms, or same or different alkyl groups having 1-3 carbon atoms, $R^4$ represents an alkyl group having 1-5 carbon atoms, $R^5$ represents an alkyl group having 1-3 carbon atoms, and $R^6$ and $R^7$ may be separate groups, in which $R^6$ represents an alkyl group having 1-3 carbon atoms and $R^7$ represents an alkyl group having 2-10 carbon atoms, a cycloalkyl group or an aryl group, or may be combined into a cycloalkylene group having 3-12 carbon atoms.

15. A curable composition according to claim 14, wherein $R^6$ and $R^7$ may be separate groups, in which $R^6$ represents an alkyl group having 1-3 carbon atoms and $R^7$ represents an alkyl group having 2-10 carbon atoms.

16. A curable composition according to claim 14, wherein the formula (I) is 1-methoxy-1-(1,1-dimethylpropylperoxy)cyclohexane.

17. A curable composition according to claim 14, wherein the formula (I) is 1-methoxy-1-(1,1-dimethylbutylperoxy)cyclohexane.

18. A curable composition according to claim 14, wherein the formula (I) is 1-methoxy-1-(1-methyl-1-phenylethylperoxy)cyclohexane.

19. A curable composition according to claim 14, wherein the formula (I) is 1-methoxy-1-(1,1-dimethylbutylperoxy)-3,3,5-trimethylcyclohexane.

* * * * *